C. A. HORNBURG.
STEERING GEAR STABILIZER.
APPLICATION FILED NOV. 22, 1919.

1,366,459.

Patented Jan. 25, 1921.

C. A. Hornburg, Inventor

Witness

By C. A. Snow & Co.
Attorneys

UNITED STATES PATENT OFFICE.

CHARLES A. HORNBURG, OF WACO, TEXAS.

STEERING-GEAR STABILIZER.

1,366,459.　　　　　Specification of Letters Patent.　　Patented Jan. 25, 1921.

Application filed November 22, 1919. Serial No. 340,018.

*To all whom it may concern:*

Be it known that I, CHARLES A. HORNBURG, a citizen of the United States, residing at Waco, in the county of McLennan and State of Texas, have invented a new and useful Steering-Gear Stabilizer, of which the following is a specification.

It is the object of this invention to provide a novel means whereby, when the grip on the steering wheel of an automobile is relaxed slightly, or when the wheels of the vehicle strike a rock or other obstruction in the road, the steering wheel will be stabilized and held, thereby preventing the ground wheels from sluing around, and preventing the steering wheel from being wrenched out of the grip of the driver, rattling, due to looseness of parts being avoided.

It is within the province of the disclosure to improve generally and to enhance the utility of devices of that type to which the invention appertains.

With the above and other objects in view, the invention consists in the novel construction and arrangement of parts hereinafter described, delineated in the drawings and particularly pointed out in the appended claims, it being understood that, within the scope of what is claimed, changes falling within the skill of a mechanic may be made without departing from the spirit of the invention.

In the accompanying drawings:—

Figure 1:
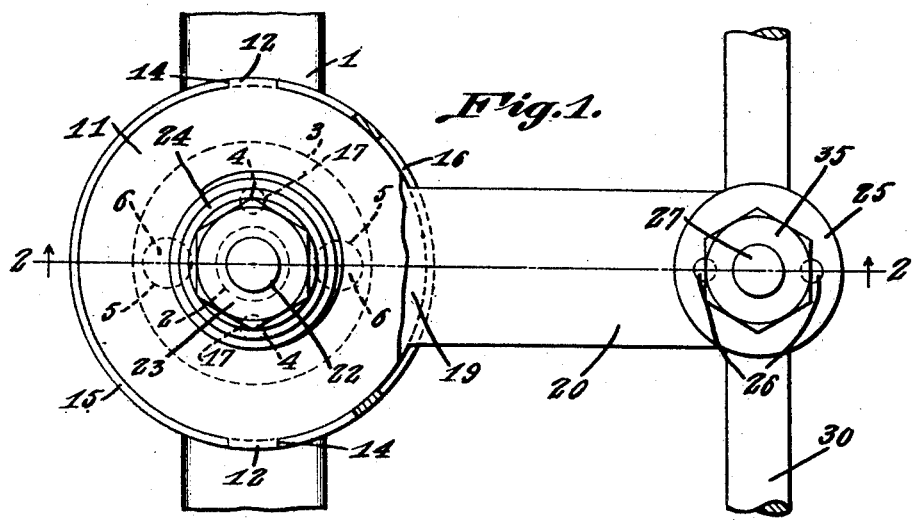
Figure 1 shows in top plan, a device constructed in accordance with the invention.
Figure 2:
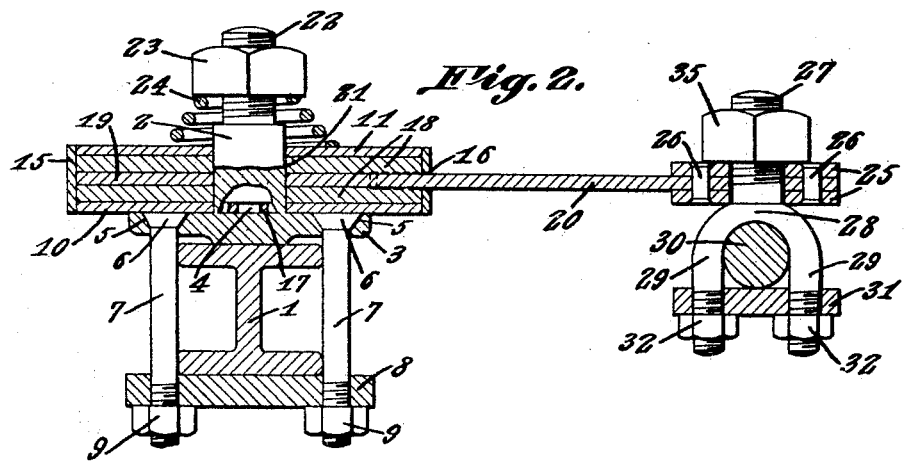
Fig. 2 is a section taken on the line 2—2 of Fig. 1, parts remaining in elevation.
Figure 3:
Fig. 3 is a cross section taken through the disks and the surrounding ring.
Figure 4:
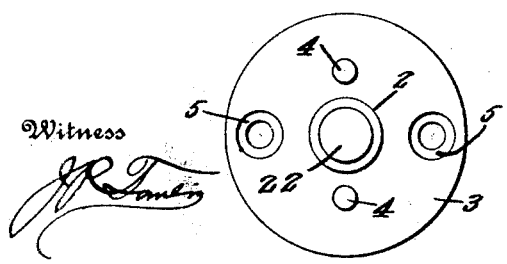
Fig. 4 is a top plan of the shaft.

The numeral 1 denotes the axle of a vehicle. The numeral 2 designates a vertical shaft having a disk-like foot 3 supported on the axle 1 and supplied with upstanding studs 4. Countersunk holes 5 are fashioned in the foot 3 and receive the heads 6 of securing elements 7 (bolts) passing through a clip 8 coöperating with the lower surface of the axle 1. Nuts 9 are threaded on the bolts 7 and engage the clip 8, means thus obviously being provided for holding the axle 1 and the shaft 2 together.

The numeral 10 denotes a lower disk, the numeral 11 designates an upper disk, the numeral 18 marks friction disks between and coöperating with the disks 10 and 11, and the numeral 19 indicates an intermediate disk having an arm 20, and located between the friction disks 18.

The lower disk 10 has openings 17 receiving the studs 4 on the foot 3 of the shaft 2. The disks 10 and 11 have marginal projections 12 received in notches 14 in a ring 15 surrounding all of the disks, the ring having a circumferentially elongated slot 16 wherein the arm 20 of the intermediate disk 19 operates. The disks 10, 11, 18 and 19 have alined openings 21 receiving the shaft 2.

The shaft 2 has a reduced end 22 on which a nut 23 is threaded, the nut engaging the smaller end of a helical spring of conical form, the wider end of the spring bearing on the upper disk 11.

The arm 20 is provided at its free end with a thickened head which may be made up of reinforcing plates 25 held by securing elements 26 on the end of the arm 20. The stem 27 of a Y-bolt 28 is journaled in the end of the arm 20 and in the reinforcing plates 25, a nut 35 being threaded on the stem 27. The legs 29 of the Y-bolt straddle the steering rod 30 of the vehicle and pass through a clip 31 coöperating with the steering rod, nuts 32 being threaded on the legs 29 to hold the clip in place on the steering rod.

The bolts 7 hold the foot 3 of the shaft 2 on the axle 1. The disk 10 cannot rotate, because the studs 4 of the foot 3 are received in the openings 17 of the disk 10. The ring 15 cannot rotate with respect to the disk 10, nor can the disk 11 rotate with respect to the ring, because these parts are connected by the interengaging elements 14—12. The spring 24 compresses the friction disks 18 on the intermediate disk 19, the arm 20 being subject to a braking action, which, in turn, is transmitted to the steering rod 30.

The device, obviously, affords a simple but efficient means whereby the objects set forth in the opening portion of this specification may be accomplished. Having thus described the invention, what is claimed is:—

In a device of the class described, a disk-like foot provided with upstanding studs and having a shaft including a reduced end defining a shoulder; a lower disk having openings receiving the studs, and an upper disk spaced from the lower disk, the disks having marginal projections; a removable ring having end notches receiving the projections, the ring being supported on the projections of the lower disk and having a circumferentially elongated slot; friction disks between the upper and lower disks within the ring; an intermediate disk between the friction disks and located within the ring, the intermediate disk comprising an arm extended through the slot, all of the disks being mounted on the shaft; a nut on the reduced end of the shaft, the shoulder constituting means for limiting the movement of the nut; and a helical spring of conical form surrounding the tip, the smaller end of the spring coöperating with a nut, and the larger end of the spring coöperating with the upper disk.

In testimony that I claim the foregoing as my own, I have hereto affixed my signature in the presence of two witnesses.

CHARLES A. HORNBURG.

Witnesses:
RUTH N. CLARK,
E. H. SPARKMAN.